United States Patent Office 2,840,554

Patented June 24, 1958

1

2,840,554

METHOD OF PREPARING CAPROLACTAM

Josef Heinrich Fritz Pieper, Berlin-Lichterfelde-West, Germany, assignor, by mesne assignments, to Hercules Powder Company, Wilmington, Del., a corporation of Delaware No Drawing. Application March 29, 1956
Serial No. 574,607

Claims priority, application Germany October 15, 1955

1 Claim. (Cl. 260—239.3)

This invention relates to the preparation of lactams and more particularly to the preparation of ε-caprolactam.

The processes for the preparing of ε-caprolactam that are known to the art and have reached technical importance take place by way of cyclohexanone oxime, which is subjected to Beckmann rearrangement and is then converted, with ring expansion, into caprolactam. The disadvantages of this rearrangement are known. The occurrence of large quantities of neutral salts is particularly troublesome.

There has been no lack of development of other processes which eliminate the Beckmann rearrangement. For example, ε-hydroxycaproic acid or its derivatives are employed as starting materials. With liquid ammonium hydroxide under pressure, ε-caprolactone results in ε-caprolactam. In another method lactones or mixtures of ω-hydroxycarboxylic acids and the corresponding lactones are converted, with the use of excess, aqueous, concentrated ammonium hydroxide and elevated temperature and pressure, into lactam. In still another method, lactams are obtained when ω-halogen fatty acids are reacted with aqueous concentrated ammonia. Still further, lactams are obtained when the corresponding ω-halogen fatty acid amides are heated with excess ammonium hydroxide under pressure at elevated temperatures.

It has now been found in accordance with this invention that ε-caprolactam is obtained in good yield by reacting esters of ε-hydroxycaproic acid with an excess of aqueous concentrated ammonium hydroxide at elevated temperatures and pressures. The most favorable temperature range for the reaction was found to be from about 250 to about 300° C.

The esters of ε-hydroxycaproic acid may be obtained in good yields by the catalytic oxidation of cyclohexane with air oxygen.

Accordingly, in contrast to the aforementioned processes, the esters of ε-hydroxycaproic acid are more easily and cheaply obtained as starting materials for lactam preparation than the described derivatives of ω-hydroxycarboxylic acids, since the preparation of the latter usually requires a multistage process.

2

Esters of ε-hydroxycaproic acid suitable for this invention are obtained from mixtures from cyclohexane oxidation by esterification or interchange of ester radicals and separated by fractional distillation. In accordance with this invention, the esters are converted into ε-caprolactam with the use of excess aqueous, concentrated ammonium hydroxide under pressure and at elevated temperatures. The presence of water and alcohols favors the reaction, which is advantageously conducted at temperatures above 200°, preferably 270–310° C. The ε-caprolactam is extracted from the reaction mixture by means of suitable solvents. After removal of the solvent, the lactam may be purified by vacuum distillation.

The process may be carried out continuously, the residence time in the reaction zone being such that, in view of the high reaction temperature and the resulting pressure, maximum conversion will be obtained.

The following example serves to illustrate the invention.

Three parts by weight of ε-hydroxycaproic acid ethyl ester (B. $P._{14}$ 132–136° C.) is treated with a ten-fold amount by weight of 29% aqueous ammonium hydroxide solution and heated in a shaking autoclave for 20 hours at 275–280° C., whereupon a pressure of 140 atm. gage is established. At the end of the reaction time, the resulting mixture is extracted with 200 parts by weight of chloroform. The solvent is distilled and the residue fractionally distilled under vacuum. At 134° C. (12 mm. mercury) 1.8 parts by weight of ε-caprolactam melting at 68° C. distills. This yield corresponds to 85% of the theoretical yield.

As the above example illustrates, this invention provides for the production of ε-caprolactam of technical grade purity having a melting point of 68° C. Moreover, it will be seen that the reaction is carried out in the presence of an excess of concentrated aqueous ammonia solution under conditions of superatmospheric pressure and temperature to give satisfactory results in respect to purity and yield of caprolactam.

What I claim and desire to protect by Letters Patent is:

The method of preparing ε-caprolactam comprising reacting an ester of ε-hydroxycaproic acid with an excess of concentrated aqueous ammonia solution under conditions of superatmospheric pressure and temperature from about 250° C. to about 300° C.

References Cited in the file of this patent

UNITED STATES PATENTS

| | | |
|---|---|---|
| 2,071,253 | Carothers | Feb. 16, 1937 |
| 2,250,468 | Cockerille | July 29, 1941 |
| 2,301,964 | Martin | Nov. 17, 1942 |
| 2,357,484 | Martin | Sept. 5, 1944 |
| 2,364,538 | Kirk et al. | Dec. 5, 1944 |
| 2,439,359 | Dixon | Apr. 6, 1948 |